A. S. KROTZ.
VEHICLE DRIVING MECHANISM.
APPLICATION FILED DEC. 16, 1908.
1,115,944.
Patented Nov. 3, 1914.
2 SHEETS—SHEET 1.
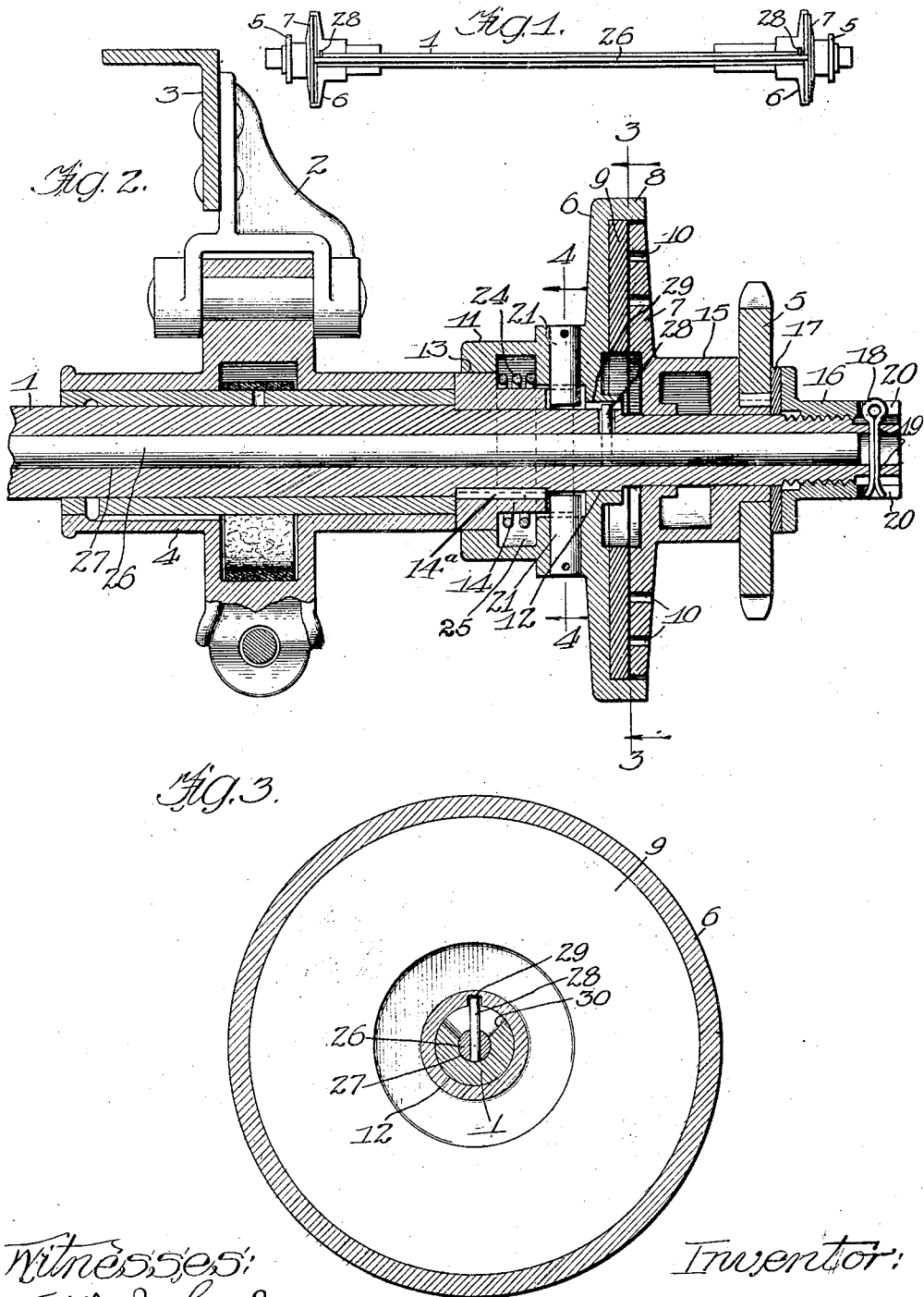

A. S. KROTZ.
VEHICLE DRIVING MECHANISM.
APPLICATION FILED DEC. 16, 1908.
1,115,944.
Patented Nov. 3, 1914.
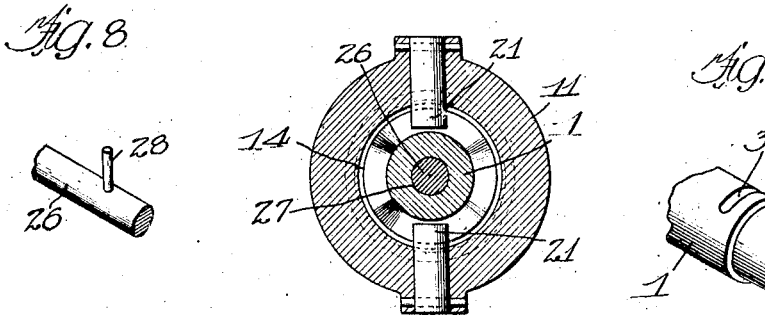
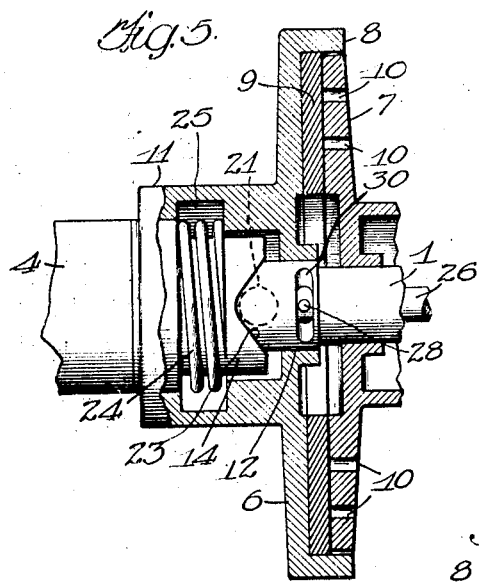
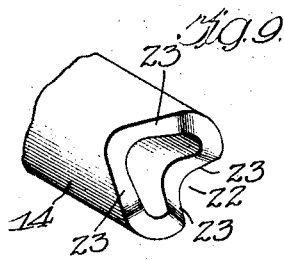
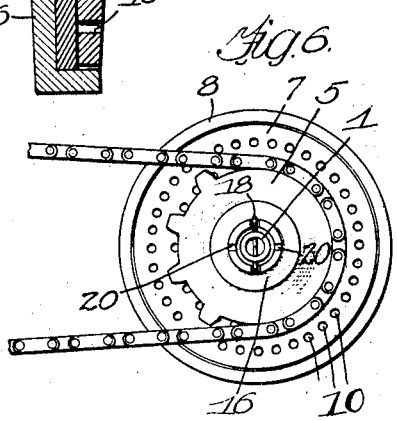
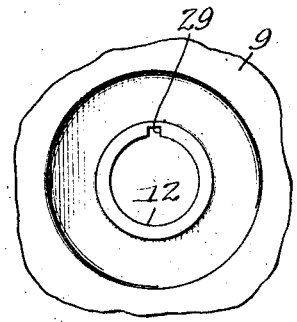
Inventor:
Alvaro S. Krotz
By Luther L. Miller
Atty.

UNITED STATES PATENT OFFICE.

ALVARO S. KROTZ, OF CHICAGO, ILLINOIS, ASSIGNOR TO SEARS, ROEBUCK & COMPANY, OF CHICAGO, ILLINOIS, A CORPORATION OF NEW YORK.

VEHICLE DRIVING MECHANISM.

1,115,944. Specification of Letters Patent. Patented Nov. 3, 1914.

Application filed December 16, 1908. Serial No. 467,865.

*To all whom it may concern:*

Be it known that I, ALVARO S. KROTZ, a citizen of the United States, residing at Chicago, in the county of Cook and State of Illinois, have invented certain new and useful Improvements in Vehicle Driving Mechanism, of which the following is a specification.

This invention relates to means for connecting the motive power of an automobile with the drive wheels and particularly to the mechanism permitting said wheels to rotate at different speeds.

One of the objects of the invention is to provide an improved differential driving mechanism for positively driving the wheels of the vehicle, either singly or together.

Another object is to provide means, in a differential driving mechanism comprising clutches, for preventing the clutch for the outside drive wheel from locking when the vehicle is moving in a curved path.

The invention also relates to the other improvements in driving mechanism hereinafter set forth.

In the accompanying drawings Figure 1 is a diagrammatic representation of a vehicle-driving mechanism embodying the features of my invention. Fig. 2 is a sectional view illustrating one end of a drive shaft and the mechanism carried thereby. Figs. 3 and 4 are sectional views on lines 3—3 and 4—4, respectively, of Fig. 2. Fig. 5 is a fragmental central sectional view taken upon a plane at right angles to the plane of Fig. 2. Fig. 6 is a view on a smaller scale taken from the right-hand end of Fig. 2. Fig. 7 is a fragmental perspective view of the tubular drive shaft. Fig. 8 is a similar view of a rod extending through said shaft. Fig. 9 is a fragmental perspective view of a cam member fixed to and encircling said shaft. Fig. 10 is a fragmental face view of one of the clutch members.

Referring to the drawings, which are intended to be understood as illustrative merely and not as limiting the invention to the construction or arrangement shown, 1 indicates a shaft to which the motive power of the vehicle is applied. The shaft 1 is supported in the vehicle in any suitable manner, as, for example, by means of brackets 2 fixed to the longitudinal sills 3 of the chassis, said brackets supporting bearings 4, one for each end of the shaft.

5 is a driving sprocket. In the embodiment herein shown, power is communicated from the drive shaft 1 to the sprocket 5 through the medium of a clutch, which clutch may be of any suitable construction. I have herein shown a friction clutch comprising a driving disk 6 and a driven disk 7, the disk 6 having an annular flange 8. One of the disks 6 and 7 may have a facing 9 of suitable friction material, such as leather. To prevent the pressure of the atmosphere from causing the disks 6 and 7 to cling together, the disk 7 may have therein a number of openings 10. The disk 6 is provided with a hub 11 having a rotative bearing at 12 upon the drive shaft 1, and at 13 upon the inner end of a sleeve 14 fixed to the shaft 1. The sleeve 14 may be fixed to the shaft by any suitable means as a key 14ª. The hub 15 of the disk 7 is rotatably mounted upon the shaft 1. To the hub 15 is rigidly fixed the driving sprocket 5. The disk 7 and the sprocket 5 are confined upon the shaft 1 by means of a nut 16 screwed upon the outer end of said shaft, an anti-friction washer 17 being interposed between said nut and the sprocket 5. Any suitable means may be provided for locking the nut 16 upon the shaft 1, as, for example, a cotter pin 18 extending through openings 19 in said shaft and through slots 20 in the outer end of the nut.

The clutch disk 6 is herein represented as driven by the drive shaft 1 by means of one or more studs 21 fixed to said disk and engaged by the sleeve 14, which sleeve, as will be remembered, is rigidly connected with the shaft 1. In the construction herein shown, two diametrically opposite studs 21 are provided, and the outer end of the sleeve 14 has recesses 22 therein, as shown in Figs. 4 and 9, to receive said studs. The recesses 22 have inclined cam walls 23. It will be seen that the recessed sleeve 14 constitutes a double-acting cam adapted to slide the disk 6 against the disk 7 whichever way the sleeve 14 is rotated with relation to the disk 6. A spring 24 tends to hold the disk 6 in contact with the disk 7. As herein shown, the spring 24 is located in an annular chamber 25 provided between the sleeve 14 and the hub 11, said spring bearing at one end against said sleeve and at its other end against said hub.

It will be seen that the devices (to wit, the cam sleeve 14 and the studs 21) connecting the drive shaft 1 and the clutch disk 6 permit of a slight relative rotation between said shaft and said disk. In order to compel the disks 6 at opposite ends of the shaft 1 to rotate together, or, in other words, to synchronize the action of the clutches, I have provided suitable means, as for example, a rod 26 extending from one end of the shaft to the other through an axial opening 27 in said shaft, said rod having fixed thereto two pins 28 engaging in longitudinal slots 29 formed in the hubs of the clutch disks 6. The shaft 1 is recessed as at 30 to accommodate the pins 28.

The clutch disks 6 are normally in contact with the clutch disks 7. When the drive shaft 1 is set in rotation, the cam surfaces 23 on the sleeves 14 force the disks 6 tightly against the disks 7, said sleeves in their rotation carrying the clutch disks with them and thus rotating the drive wheels of the vehicle. When the vehicle is being driven in a substantially straight course, the rotation of the shaft 1 causes the drive wheels to be rotated together at the same speed.

It will be remembered that the clutch disks 6 are coupled together through the medium of the rod 26 and the pins 28, so as always to rotate at the same speed. When the vehicle turns a corner, the outside drive wheel of the vehicle rotates more rapidly than the inner drive wheel, consequently the clutch disk 7 for said outside wheel is rotated faster than its companion clutch disk 6, said disk 7 slipping past the disk 6. The coupling device 26 28 engages the clutch disks 6 loosely enough to permit of the disk 6 for the outside vehicle wheel yielding sufficiently to allow the disk 7 to run ahead, as just described, but said coupling device prevents the disk 6 for the outside wheel from being carried ahead by its disk 7 away from one cam surface 23 into contact with the other cam surface and thereby being forced into locking engagement with its disk 7.

It will be understood that, should one of the drive wheels of the vehicle slip or be raised from contact with the roadway, the other wheel will still be positively driven and will receive practically all of the force applied to the shaft 1.

I claim as my invention:

1. In a vehicle-driving mechanism, in combination, a drive shaft; two elements to be driven; two structurally independent friction clutches, one between each of said elements and said shaft, each of said clutches comprising two members which are continually in contact with one another, one of said clutch members being arranged to be driven by the shaft, and the other clutch member being connected to the corresponding driven element; and means other than the drive shaft for synchronizing the action of said clutches to prevent the clutch member for the driven element from driving its companion clutch member.

2. In a vehicle-driving mechanism, in combination, a drive shaft; two elements to be driven; a clutch between each of said elements and said shaft, said clutches being mounted upon said shaft, and each of said clutches comprising two members which are continually in contact with one another, one of said clutch members being arranged to be driven by the shaft, and the other clutch member being connected to the corresponding driven element; and means extending through said shaft from one clutch to the other for synchronizing the action of said clutches to prevent the clutch member for the driven element from driving its companion clutch member.

3. In a vehicle-driving mechanism, in combination, a drive shaft; two elements to be driven; a friction clutch between each of said elements and said shaft, each of said clutches comprising a driving member and a driven member which are continually in contact one with the other, and means other than the drive shaft for connecting the driving member of one clutch to the driving member of the other so that said driving members shall always rotate together.

4. In a vehicle-driving mechanism, in combination, a drive shaft; two elements to be driven; a clutch between each of said elements and said shaft, each of said clutches comprising a driving member and a driven member mounted upon said shaft, said members being continually in contact one with the other; a rod extending axially through said shaft; and means for connecting each of said driving members with said rod.

5. In a vehicle-driving mechanism, in combination, a drive shaft; two driven clutch members rotatably mounted on said shaft; two driving clutch members slidably mounted on said shaft and arranged for a slight amount of rotation with reference to said shaft; two double-acting cams fixed to said shaft, one being provided for each driving clutch member to slide such driving clutch member into clutch relation to the corresponding driven clutch member; and means connecting said driving clutch members for synchronous rotation.

6. In a vehicle-driving mechanism, in combination, a shaft; a clutch member rotatably mounted on said shaft; a clutch member arranged to be rotated by said shaft; a spring for holding said clutch members together, said spring being free to act at all times; and means for preventing the rotatably mounted clutch member from rotating the other clutch member when said rotatably mounted clutch member overruns, during a turning movement of the vehicle, said rotatably mounted clutch member slipping past said other clutch member during such overrunning.

7. In a vehicle-driving mechanism, in combination, a driving clutch member; a driven clutch member; means for holding said clutch members together, said members being free to act at all times; and means for preventing the driven clutch member from rotating the driving clutch member when said driven member overruns during a turning movement of the vehicle, said driven member slipping past said driving member during such overrunning.

8. In a vehicle-driving mechanism, in combination, a shaft, a driven clutch member; a driving clutch member mounted on said shaft; means on said shaft for moving the driving clutch member into locking engagement with the driven clutch member and for connecting said driving clutch member with said shaft; a spring tending to hold said clutch members in operative relation with each other, said spring being free to act at all times; and means for preventing the driven clutch member from rotating the driving clutch member when said driven member overruns during a turning movement of the vehicle, said driven member slipping past said driving member during such overrunning.

9. In a vehicle-driving mechanism, in combination, a shaft; a driven clutch member; a driving clutch member having a hub rotatably mounted on said shaft; a stud fixed to said hub; a sleeve fixed on said shaft, said sleeve having a recess therein to receive the stud, said recess having oppositely inclined cam walls; a spring tending to hold said driving clutch member in contact with the driven clutch member; and means for preventing the driven clutch member from rotating the driving clutch member when the vehicle is turning.

10. In a vehicle-driving mechanism, in combination, a shaft; a driven clutch member; a driving clutch member slidable and rotatable on said shaft; means on said shaft for connecting said driving clutch member with said shaft and for holding said driving clutch member in operative relation with the driven clutch member; a spring tending to hold said driving clutch member in operative relation with the driven clutch member; and means for preventing the driven clutch member from rotating the driving clutch member when the vehicle is turning, said means comprising a rod lying within said shaft, said rod carrying a pin engaging in a slot in said driving clutch member.

11. In a vehicle-driving mechanism, in combination, a shaft; a driven friction clutch disk; a driving friction clutch disk slidable to a slight extent on said shaft; means on said shaft having opposite cam surfaces adapted to engage said driving clutch disk for causing it to rotate with said shaft and for sliding it into forcible contact with said driven clutch disk, said driving clutch disk being free at times to rotate to a slight extent on said shaft; and means for preventing said driven clutch disk from rotating said driving clutch disk into contact with one of said cam surfaces when said driven disk overruns during a turning movement of the vehicle.

ALVARO S. KROTZ.

Witnesses:
 WALTER L. HUDSON,
 GEORGE L. CHINDAHL.